Nov. 22, 1966   J. A. PETRIE   3,286,930
JET PIPE ASSEMBLY
Filed July 10, 1964

Inventor
JAMES ALEXANDER PETRIE
By
Cushman, Darby & Cushman
Attorneys

United States Patent Office

3,286,930
Patented Nov. 22, 1966

3,286,930
JET PIPE ASSEMBLY
James Alexander Petrie, Littleover, Derby, England, assignor to Rolls-Royce Limited, Derby, England, a company of Great Britain
Filed July 10, 1964, Ser. No. 381,679
Claims priority, application Great Britain, July 17, 1963, 28,368/63
7 Claims. (Cl. 239—265.27)

This invention concerns a jet pipe assembly.

According to the present invention, there is provide a jet pipe assembly for a jet engine, said assembly comprising an engine jet pipe, a plurality of forward propulsion nozzle members mounted at or adjacent the downstream end of the jet pipe, a plurality of branch pipes each of which is adapted to communicate with the jet pipe and each of which is provided with an additional nozzle which is or may be arranged to direct the jet gases downwardly, the forward propulsion nozzle members being movable between a first position, in which they both collectively form a forward propulsion nozzle through which the jet gases are discharged rearwardly and in which they also simultaneously cut off the said branch pipes from communication with the jet pipe, and a second position in which they collectively blank off the downstream end of the jet pipe and simultaneously deflect the jet gases from the jet pipe into the branch pipes, and means for moving the forward propulsion nozzle members into and between the said first and second positions.

Each additional nozzle is preferably movable to vary the direction of the jet gases passing therethrough. Thus each additional nozzle may be movable to deflect the jet gases rearwardly, downwardly, and forwardly, as desired.

Each additional nozzle may, for example, comprise a rotatable member carrying an assembly of jet deflector vanes, means being provided for effecting rotation of the said rotatable members.

Preferably there are two half-cylindrical forward propulsion nozzle members each of which has an oblique cut-away portion at its front and which, in the said second position, lies against the corresponding portion of the other forward propulsion member.

Each of the forward propulsion nozzle members is preferably so formed and is pivoted at a fulcrum which is so disposed that each forward propulsion nozzle member is, in both the said positions, subjected by the jet gases to oppositely directed and substantially balanced turning moments.

Each forward propulsion nozzle member may moreover be provide at its upstream end with a curved portion which, when in the said second position, assists in deflecting the jet gases into the respective branch pipe.

The invention also comprises a jet engine provided with a jet pipe assembly as set forth above.

Figure 1:
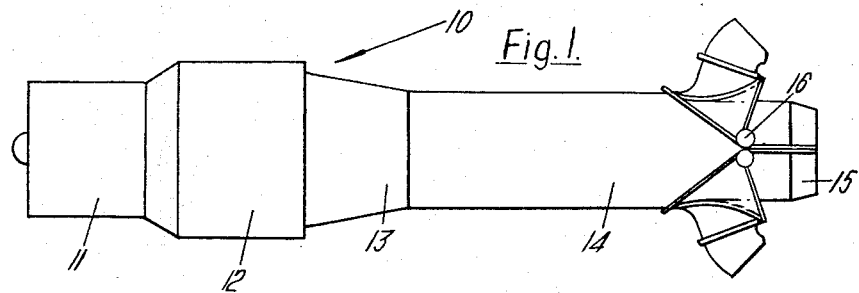
Figure 2:
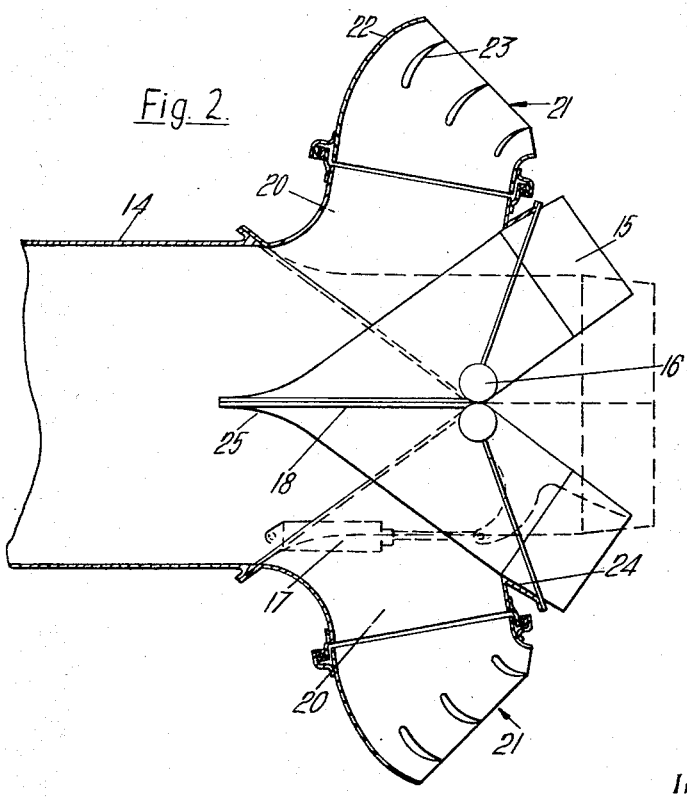

The invention is illustrated, merely by way of example, in the accompanying drawings, in which:

FIGURE 1 is a diagrammatic plan view of a gas turbine engine provided with a jet pipe assembly according to the present invention, and FIGURE 2 is a section through part of the jet pipe assembly of FIG. 1.

Referring to the drawings, a gas turbine engine 10 comprises in flow series one or more compressors 11, combustion equipment 12, one or more turbines 13, and a jet pipe 14.

At or adjacent the downstream end of the jet pipe 14 are two half-cylindrical forward propulsion nozzle members 15, each of which is mounted on a fulcrum 16 and each of which may be moved by one or more pneumatic or hydraulic rams 17 into and between the full line and dotted line positions shown in FIG. 2.

Each of the forward propulsion nozzle members 15 has an olbique cut away portion 18 at its front end which, in the said full line position, lies against the portion 18 of the other forward propulsion nozzle member 15.

Each forward propulsion nozzle member 15 is so formed and its fulcrum 16 is so disposed that, both in the full line and in the dotted line position, the member 15 is subjected by the jet gases to oppositely directed and substantially balanced turning moments.

The jet pipe 14 communicates, when the forward propulsion nozzle members 15 are in their full line position, with two branch pipes 20. Each of the branch pipes 20 is provided with an additional nozzle 21 which, as disclosed in our U.S. Patent No. 3,130,543, comprises a rotatable member 22 carrying an assembly of jet deflector vanes 23. Means (not shown) are provided for rotating the rotatable members 22 so that jet gases passing through the branch pipes 20 may be deflected rearwardly, downwardly, and forwardly as desired.

When the forward propulsion nozzle members 15 are in their full line position, they blank off the downstream end of the jet pipe 14 by lying against a frusto-conical surface 24 at said downstream end. At the same time, when they are in this position, the forward propulsion nozzle members 15 deflect the jet gases from the jet pipe 14 into the branch pipes 20, such deflection of the jet gases being assisted by the fact that each of the forward propulsion nozzle members 15 is provided at its upstream end with a curved portion 25.

When, however, the forward propulsion nozzle members 15 are in their dotted line position, they collectively form a forward propulsion nozzle through which the jet gases are discharged rearwardly while at the same time they cut off the branch pipes 20 from communication with the jet pipe 14.

During take-off, the forward propulsion nozzle members 15 will be in their full line position so that all the jet gases will pass through the additional nozzles 21. The latter will initially be arranged to direct the jet gases vertically downwardly and will, when sufficient height is reached, be rotated so as to direct the jet gases rearwardly. The forward propulsion nozzle members 15 will then be moved to their dotted line positions so that, during forward flight, all the jet gases will pass through the forward propulsion nozzle formed thereby.

When landing is to be effected, the forward propulsion nozzle members 15 will be moved to their full line position, and the additional nozzles 21 will be gradually rotated until they direct the jet gases vertically downwardly. When the aircraft has landed, the additional nozzles 21 may be rotated so as to direct the jet gases forwardly, whereby to effect braking.

I claim:
1. A jet pipe assembly for a jet engine, said assembly comprising an engine jet pipe, a plurality of forward propulsion nozzle members mounted adjacent the downstream end of the jet pipe, a plurality of branch pipes each of which is adapted to communicate with the jet pipe and each of which is provided with an additional nozzle which direct the jet gases downwardly, the forward propulsion nozzle members being movable between a first position in which they both collectively form a forward propulsion nozzle through which the jet gases are discharged rearwardly and in which they also simultaneously cut off the said branch pipes from communication with the jet pipe, and a second position in which they collectively blank off the downstream end of the jet pipe and simultaneously deflect the jet gases from the jet pipe into the branch pipes, and means for moving the forward propulsion nozzle members into and between the said first and second positions.

2. A jet pipe assembly as claimed in claim 1 in which each additional nozzle is movable to vary the direction of the jet gases passing therethrough.

3. A jet pipe assembly as claimed in claim 2 in which each additional nozzle is movable to deflect the jet gases rearwardly, downwardly, and forwardly, as desired.

4. A jet pipe assembly as claimed in claim 3 in which each additional nozzle comprises a rotatable member carrying an assembly of jet deflector vanes.

5. A jet pipe assembly for a jet engine, said assembly comprising an engine jet pipe, two half-cylindrical forward propulsion nozzle members mounted adjacent the downstream end of the jet pipe, each forward propulsion nozzle member having an oblique cut away portion at its front end, a plurality of branch pipes each of which is adapted to communicate with the jet pipe and each of which is provided with an additional nozzle which may direct the jet gases downwardly, the forward propulsion nozzle members being movable between a first position in which they both collectively form a forward propulsion nozzle through which the jet gases are discharged rearwardly and in which they also simultaneously cut off the said branch pipes from communicating with the jet pipe, and a second position in which their oblique cut-away portions lie against each other and in which they collectively blank off the downstream end of the jet pipe into the branch pipes, and means for moving the forward propulsion nozzle members into and between the said first and second positions.

6. A jet pipe assembly as claimed in claim 5 in which each of the forward propulsion nozzle members is, in both the said positions, subjected by the jet gases to oppositely directed and substantially balanced turning moments.

7. A jet pipe assembly as claimed in claim 5 in which each forward propulsion nozzle member is provided at its upstream end with a curved portion which, when in the said second position, assists in deflecting the jet gases into the respective branch pipe.

References Cited by the Examiner
UNITED STATES PATENTS 3,025,667   3/1962   Moorehead _____ 239—265.25
3,088,275   5/1963   Marchant et al. ___ 239—265.25
3,164,337   1/1965   Hooper _____ 239—265.25

EVERETT W. KIRBY, *Primary Examiner.*